March 10, 1970 W. L. ROBINSON 3,499,514
CHECK CONTROLLED DISPENSING APPARATUS
Filed Feb. 28, 1968 4 Sheets-Sheet 4

INVENTOR
WILLIAM LOVELL ROBINSON
BY
Bacon & Thomas
ATTORNEYS

United States Patent Office 3,499,514
Patented Mar. 10, 1970

3,499,514
CHECK CONTROLLED DISPENSING APPARATUS
William Lovell Robinson, Northolt, England, assignor to Electric Shop Development Limited, London, England, a British company
Filed Feb. 28, 1968, Ser. No. 708,969
Claims priority, application Great Britain, Feb. 28, 1967, 9,536/67
Int. Cl. G07f 11/00
U.S. Cl. 194—10          6 Claims

ABSTRACT OF THE DISCLOSURE

Dispensing apparatus for operation in two or more different ways, having a register for each possible operation to count the number of articles dispensed according to that operation and to stop the dispensing when the appropriate number has been dispensed. A sensing means senses the dispensing of each article and is normally connected to the register for one possible operation but during another possible operation is automatically connected instead to the register for that other operation. Thus one possible dispensing operation (e.g. a fruit machine operation) may be interrupted by other possible operations (e.g. change giving operations).

---

The invention relates to dispensing apparatus.

The invention provides a dispensing apparatus capable of being operated in at least two different ways to dispense a succession of articles, which apparatus includes means for sensing the dispensing of each article, a registering means for each possible operation of the apparatus to count the number of each sort of articles dispensed according to that operation and to stop the dispensing of further articles for that operation when the appropriate number has been dispensed, and connecting means for normally connecting the sensing means to the registering means for one possible operation of the machine, the connecting means being arranged, when the apparatus is operated according to another of its possible operations, to disconnect the sensing means automatically from the registering means for the said one operation and to connect it instead to the registering means for the said other operation, the connecting means also being arranged, on completion of that other operation, to connect the sensing means automatically with the registering means for the said one operation so that the apparatus will resume the said one operation if it is incomplete.

The dispensing apparatus may have for at least one or other of its possible operations an article receiving part for receiving articles of a number of different sorts and for sorting them and a control for controlling that operation of the apparatus which control comprises a number of control switches each positioned in the article receiving part of the apparatus so as to be operated when an article of a particular sort is received and connected to start the dispensing of articles when operated, the registering means for that operation having a number of outputs, one for each sort of article which can be received by the receiving part of the apparatus, each output being arranged to be selected by the associated one of the control switches when the control switch is operated and, if so selected, to be operated by the registering means when the number of articles predetermined in accordance with the particular control switch operated has been dispensed, and each output being connected to stop the dispensing of articles for that operation when the output is operated.

The control may be for controlling the said other operation of the apparatus, in which case each control switch is connected to the connecting means so that when the control switch operates the connecting means disconnects the sensing means from the registering means for the said one operation and connects it instead to the registering means for the said other operation, and each output is connected to the connecting means so that when the output is operated on completion of that other operation it operates the connecting means to restore the connection between the sensing means and the registering means for the said one operation. At least one registering means may be a stepping switch.

The connecting means may include a pawl, and the registering means for at least one of the possible operations of the apparatus may include a ratchet, the pawl and ratchet being for operation together, the connecting means being arranged, when the apparatus is being operated according to another possible operation of the apparatus, to prevent the pawl from operating the ratchet.

The connecting means may also include a solenoid arranged to be operated, when the apparatus is being operated according to the said other possible operation of the apparatus, to move the pawl clear of the ratchet. Each control switch may be arranged, when operated (to operate the solenoid.

The apparatus when it operates according to the said other operation may operate as a change giving machine. The apparatus when it operates according to the said one operation may operate as a fruit machine.

If the dispensing apparatus may in operation both receive and dispense articles of a particular kind one at a time, it may have an indicator for indicating when the difference between the numbers of articles of that particular kind received and dispensed respectively by the apparatus has fallen to a predetermined value, the indicator comprising first and second sensing means for sensing the receipt into or dispensing from the apparatus respectively of each article of that particular kind, counting means arranged to be operated by the first and second sensing means to add and substract when the articles are received and dispensed respectively, and signalling means, the counting means being arranged to operate the signalling means only when the said difference has fallen to a predetermined value. The said sensing means and the second sensing means may be one and the same. The counting means may be arranged to provide a visual indication of the said difference.

In this specification the term article includes coins and coin tokens.

Embodiments of the invention will now be described by way of example with reference to FIGURES 1 to 5 of the accompanying drawings in which.

Figure 1:
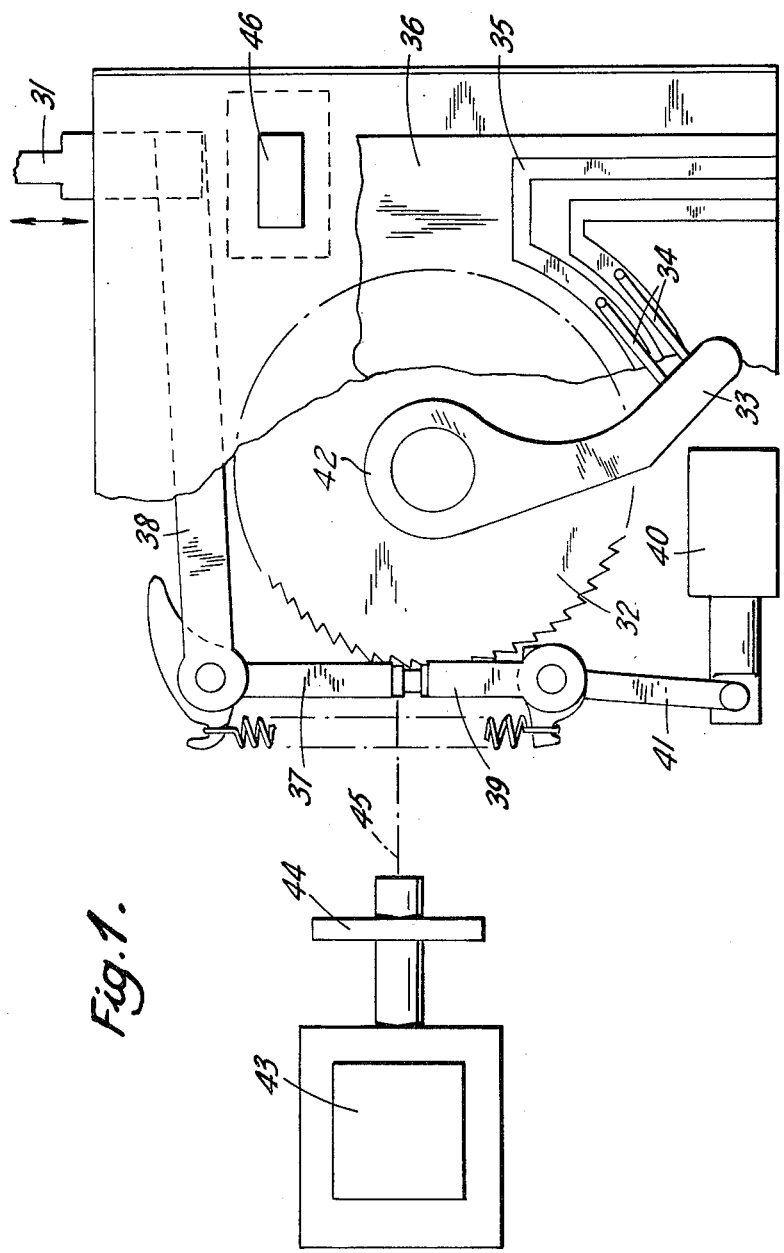
FIGURE 1 is a diagrammatic view of part of an apparatus capable of being operated in two different ways, as a fruit machine and as a change giving machine respectively.

The apparatus is a combined fruit machine and change giving machine and is capable of being operated in two different ways either as a fruit machine or as a change giving machine to dispense a succession of three-penny coin tokens. The apparatus has a hopper (not shown) for storing coin tokens inside which is positioned a disc (not shown) having slots around its periphery. To dispense tokens a hopper mo'or (not shown) is arranged to rotate the disc so that tokens are picked up in the slots in the periphery of the disc and are then dispensed from the apparatus one at a time by being allowed to fall out of the slots. Referring to FIGURE 1 the lever 31 senses the dispensing of each token by being positioned so that it is moved up and down by each token as it is dispensed.

The fruit machine is of the type known as the "Jolly Joker," which accepts sixpences and three-penny tokens, a sixpence allowing the machine to be operated twice and a token allowing it to be operated once. The tokens are larger in diameter than a sixpence thus permitting sixpences and tokens to be separated on a diameter basis within the machine. The sixpences are fed to a cash box, where they are retained, and the tokens are fed to the storage hopper. The fruit machine is operated by pulling a handle (not shown) which causes reels (not shown) carrying fruit symbols to spin. After a time all the reels come to rest and one or more electrical circuits may be made or broken depending on the symbols displayed i.e. on the rest positions of the reels. If a winning combination of symbols is displayed an electrical circuit associated with that combination is completed so that the hopper motor is energised to rotate the disc and start the dispensing of tokens. The fruit machine is provided with a register shown in FIGURE 1 to count the number of tokens dispensed and to stop the dispensing of further tokens when the number appropriate to the winning combination has been dispensed. This register comprises the ratchet wheel 32, the arm 33 mounted on the wheel for rotation therewith, and two wipers 34 which are carried by the arm 33 and which are in electrical contact with radial printed circuits 35 on a disc 36, only part of which is shown in FIGURE 1. The ratchet wheel 32 is normaly connected to the lever 31 by a pawl 37, which is carried by an arm 38 attached to the lever 31, the arrangement being such that each time the lever 31 moves up and down i.e. each time a token is dispensed, the pawl 37 will rotate the ratchet wheel 32 an amount corresponding to one tooth, the detent 39 being provided to prevent the wheel moving back after it has rotated, so that the wheel as it rotates counts the number of tokens dispensed.

The electrical circuit which is completed to start the hopper motor when the reels of the fruit machine come to rest with the fruit symbols in a winning position includes one of the wipers 34 and the associated one of the printed circuits 35. As the wheel 32 counts the number of tokens dispensed the wiper 34 is moved along the associated printed circuit 35, and the length of the printed circuit 35 is arranged so that the wiper will come to the end of it and break the electrical circuit hitherto causing the hopper motor to operate, when the number of tokens appropriate to the winning combination of fruit symbols displayed has been dispensed. The fruit machine is arranged so that the reels cannot be spun again until a dispensing operation from the fruit machine has been completed, otherwise the hopper motor would be stopped before a dispensing operation was complete. It will be noted that if the mains supply to the apparatus is interrupted the wipers 34 will remain in position so that the dispensing from the hopper will automatically resume after the mains supply has been restored.

At the completion of a dispensing operation from the fruit machine the reset solenoid 40 is arranged to be operated so that its plunger 41 moves the detent 39 and the pawl 37 to the left as seen in FIGURE 1 so that they are completely clear of the ratchet wheel 32 and so that a helical spring 42 may be allowed to return the wheel 32 to its initial position.

Figure 2:
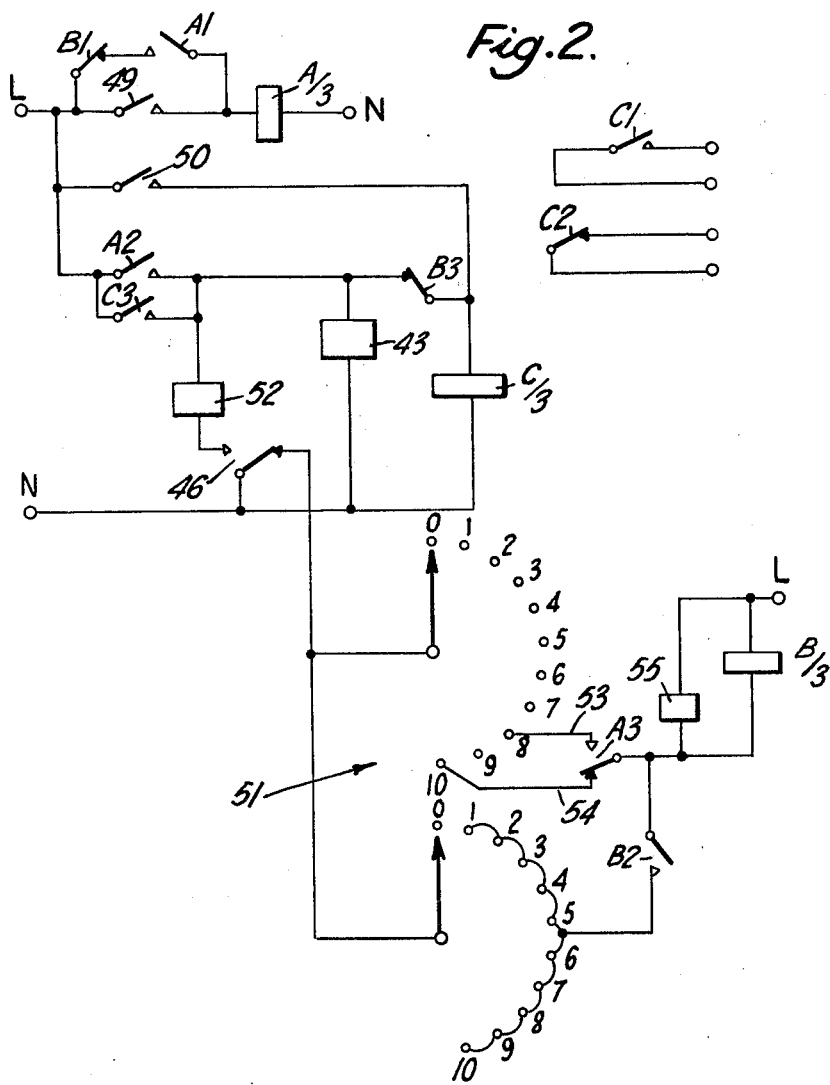
FIGURE 2 is a circuit diagram of a control for the apparatus shown in FIGURE 1.

The control circuit of the apparatus which controls the change giving machine is shown in FIGURE 2. The change giving machine has a coin receiving part for receiving either two-shilling coins or half crowns and for sorting the coins (e.g. by means of suitably sized entry slots for the coins).

The control circuit operates from AC main supply terminals L and N and has two microswitches 49 and 50 which are positioned in the coin receiving part of the machine so as to be automatically and momentarily closed when a two-shilling coin and a half crown coin are received respectively. The switches 49 and 50 are in the energising circuits of the relays A/3 and C/3 respectively, and these relays have relay operated switches A1, A2 and A3, and C1, C2 and C3 respectively. The relay operated switch C1 is in an energising or control circuit for the hopper motor, the circuit being arranged so that when the switch is closed the motor operates.

When the switch 49 closes on receipt of a two-shilling coin the relay A/3 is energised and its relay operated switches A1, A2 and A3 closed. The closing of the switch A1 maintains a holding circuit for the relay A/3, and the closing of the switch A2 energises the relay C/3. When the switch 50 closes on receipt of a half crown coin the relay C/3 is energised without the relay A/3 being first energised. Thus whether a two-shilling coin or a half crown coin is received the relay C/3 is energised so that the relay operated switch C1 is closed to start the hopper motor causing the dispensing or three-penny coin tokens to start. The relay C/3 when energised also closes the relay operated switch C3 which maintains a holding circuit for the relay C/3 so that the dispensing of coin tokens once started will continue.

The pawl 37 is arranged, when the apparatus is operated as a change giving machine, to disconnect the lever 31 from the register for the fruit machine shown in FIGURE 1 by the provision of a solenoid 43 (shown also in FIGURE 2) which is energised by the closing of the switch C3 and which when energised pulls it's plunger 44 to the left as seen in FIGURE 1. The plunger 44 is connected to the pawl 37 by a flexible linkage 45, which allows free vertical movement of the pawl, so that the leftward movement of the plunger 44 moves the pawl 37 clear of the ratchet wheel 32. Thus the ratchet wheel 32 does not count tokens dispensed according to a change giving operation.

The control for the change giving machine is provided with a register comprising the rotary step up switch 51 to count the number of three-penny tokens dispensed according to a change giving operation.

The switch 51 has two rotary contacts which are ganged together and which can be in any one of eleven positions and are normally in the rest or zero position and has a stepping up coil 52 which each time it is energised, steps the contacts of the step up switch 51 up one position. The step up switch 51 is conveniently a "Rodene" type 780 stepping relay.

The lever 31 apart from moving the pawl 37 each time it moves up and down also operates the switch 46 shown in both FIGURES 1 and 2. When the apparatus is operated as a change giving machine the register 51 is operatively connected to the lever 31 by the closing of the switch C3 which causes the coil 52 to be energised each time the switch 46 is operated i.e. each time a coin token is dispensed.

Thus when the apparatus is operated as a change giving machine the closing of the switch C3 automatically disconnects the lever 31 from the register for the fruit machine and connects it instead to the register for the change giving machine.

The switch 51 has two outputs 53 and 54 leading from its eighth and tenth positions respectively. The outputs 53 and 54 lead to the relay operated switch A3. The switch A3 normally selects the output 54 as shown in FIGURE 2 and will continue to do so when a half crown coin is received when the relay A/3 will remain unenergised. However, when a two-shilling coin is received the switch A3 will be operated to select the output 53.

When the apparatus is giving change for a two-shilling coin the output 53 will be selected so that when eight three-penny tokens have been dispensed as change and the contacts of the switch 51 have reached their eighth position the coil 55 and the relay B/3 will be energised. The coil 55, when energised, resets the switch 51 by releasing a helical spring (not shown) allowing it to move the two rotary contacts back to their initial position. The time for which the coil 55 is energised does not have to be as long as the actual time required by the spring to reset the switch 51. The relay B/3 when energised opens its relay operated switches B1 and B3 and closes its relay operated switch B2. The closing of the switch B2 maintains a holding circuit for the relay B/3 and for the coil 55 through the second contact of the step up switch 51 until the step up switch 51 has been returned to its initial position, and the opening of the switches B1 and B3 de-energises the relays A/3 and C/3 respectively so that the dispensing of further coins is stopped.

The operation of the apparatus to give change for a half crown is similar except in that as the output 54 is selected ten coin tokens will be dispensed before the dispensing of tokens is stopped and the step up switch 51 reset.

It is not necessary for eight or ten tokens to be dispensed as change for a two-shilling piece or a half crown respectively. The outputs 53 and 54 in FIGURE 2 may be connected to positions 7 and 9 respectively of the switch 51 and a suitable contact of the relay C used to allow the fruit machine to be operated once in lieu of the odd token.

If the fruit machine is in the process of dispensing a large number of tokens it is possible for its dispensing operation to be interrupted by several dispensing operations of the change giving machine.

When a change giving operation is started the relay C/3 will also open its relay operated switch C2. This switch when opened de-energises a solenoid (not shown) to allow a spring (not shown) to operate a mechanism (not shown) for blocking the entry of coins into the coin receiving part of the change giving machine. The fruit machine will also have a similar mechanism to block the entry of coins if the apparatus is in the process of dispensing coin tokens according to a change giving operation. However as the change giving machine may interrupt a dispensing operation of the fruit machine the switch C2 is not opened when the fruit machine is opearted.

Figure 3:
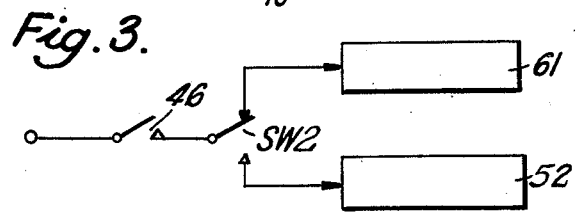
FIGURE 3 is part of the circuitry of a modified form of the apparatus shown in FIGURES 1 and 2.

It is not necessary for the pawl 37 and detent 39 to be connected mechanically to the lever 31. Instead as shown in FIGURE 3 the pawl 37 may be operated by a solenoid 61 energized by the sensing switch 46. The switch SW2 normally connects the switch 46 to the solenoid 61 but during change giving operation it is switched by the solenoid 43 to connect it instead to the step up coil 52.

The machine may be provided with an indicator for indicating when the difference between the numbers of tokens received by and dispensed from respectively the hopper has fallen to a predetermined value. For this purpose an electrically operated counter of the cyclometer type is used having two sensing coils, microswitches or the like. One coil is arranged to send a positive pulse to the counter when a token is received to cause it to add and the other is arranged to send a negative pulse to the counter when a token is dispensed to cause it to subtract. The second sensing switch may of course be the switch 46. An electrical contact is arranged on the counter to operate a signalling means when the difference in the numbers of tokens received and dispensed has fallen to a predetermined value. Preferably the contact is adjustable so the number of tokens left for which the indicator operates can be changed. For this purpose an English Numbering Machine type 443 counter may be used. Such a counter may be arranged to give a visual indication of the difference and may be provided with a reset facility.

Figure 4:
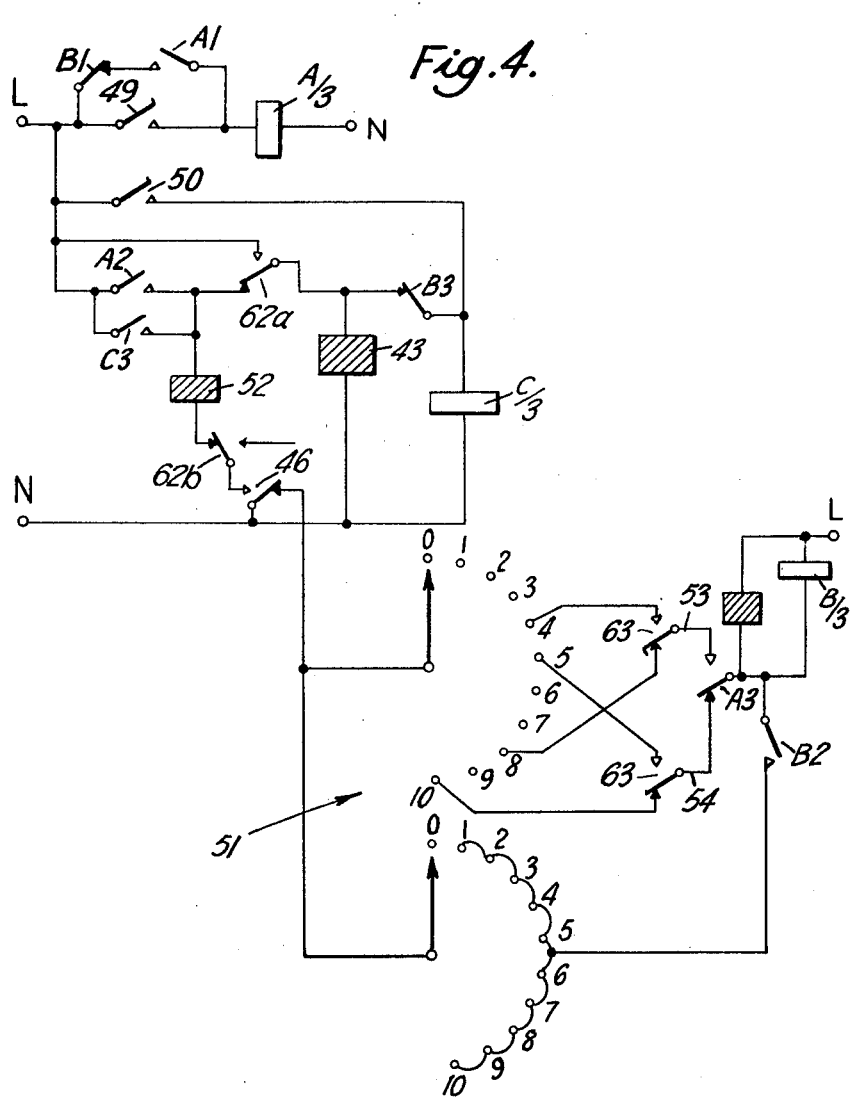
FIGURES 4 and 5 are circuit diagrams of modifications of the control shown in FIGURE 2.

FIGURE 4 shows a modification of the control circuit shown in FIGURE 2. The circuit is additionally provided with manually operable switches 63 and one having two ganged contacts 62a, 62b. When this switch is operated, the contact 62a operates the solenoid 43 to disconnect the pawl 37 from the ratchet wheel 32 and the relay C/3 to start the dispensing of tokens as described above, and the contacts 62b open to disconnect the step up switch 51. The purpose of the switch 62 is to cause all the coins contained to be dispensed so that they be counted (by an indicator if it is provided). The ganged switches 63 are provided to convert the control from one which controls the dispensing of eight and ten threepenny tokens to one which controls the dispensing of four and five six-penny tokens in exchange for a two-shilling piece and a half crown piece respectively.

Figure 5:
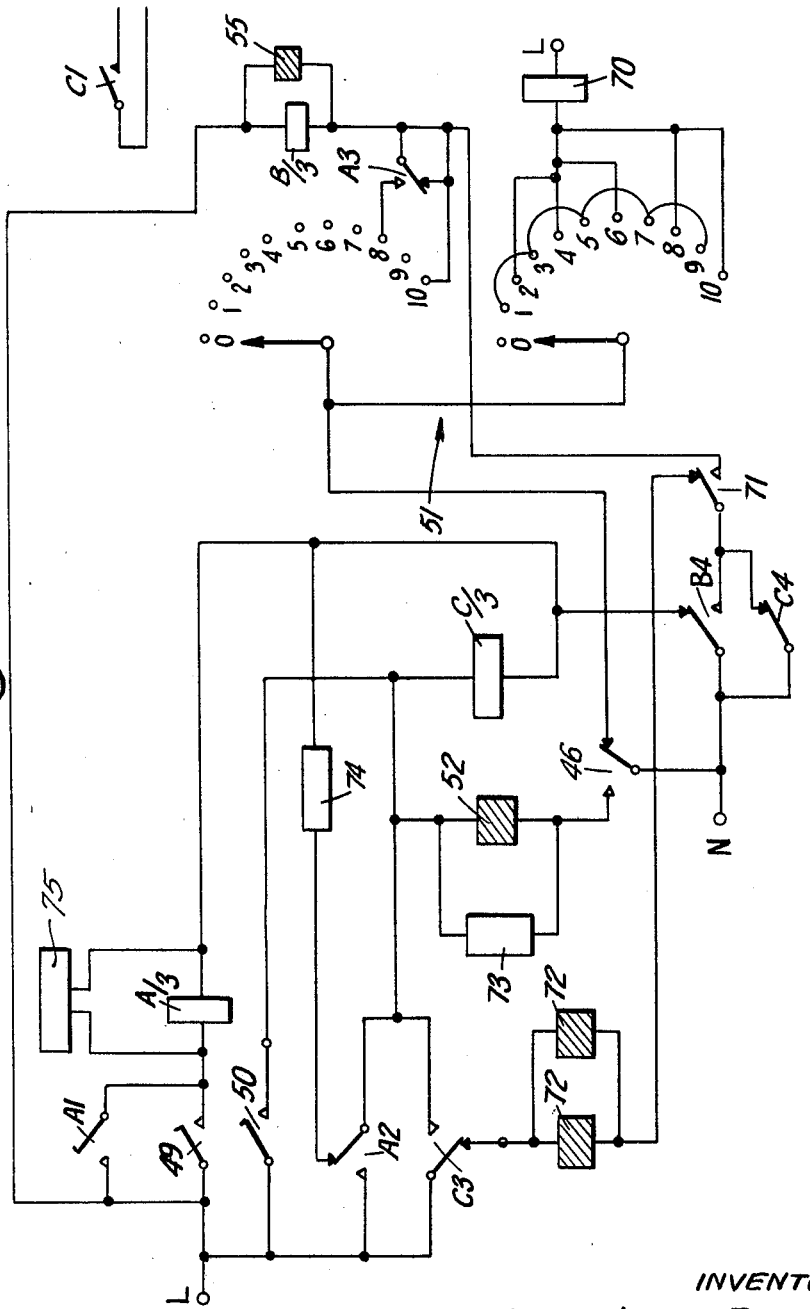

FIGURE 5 shows how the control circuit may be further modified, and as this control circuit is basically similar to those of FIGURES 2 and 4 it will be described only in so far as it differs.

The relay B/3 instead of controlling two relay operable switches B1 and B3 in the holding circuits of the relays A/3 and C/3 respectively controls a single relay operable switch B4 common to the holding circuits of both relays A/3 and C/3. The switch B4 like the switches B1 and B3 is normally closed being opened when the relay B/3 is energized at the end a change giving operation.

The second contact of the step up switch 51 is not used for maintaining a holding circuit for the coil 55 and the relay B/3, and is used instead for operating a counter 70 which counts in sixpenny units. The first, third, fifth, seventh and ninth positions of the second contact of the step up switch 51 are shared out and the second, fourth, sixth, eight and tenth positions are connected to the counter 70 to energize the counter each time two threepenny tokens have been given as change. It will be appreciated that the particular positions of the switch connected to the counter 70 would be adjusted accordingly if the machine were arranged to give change in coins or tokens of a different value or if the counter counted in units other than sixpences.

The holding circuit to keep the relay B/3 and the coil 55 energized is provided by the relay operable switch B4 and by the switch 71, which is mechanically coupled to the step up switch 51 so as to be moved to its position other than that shown in FIGURE 5 whenever the contacts of the step up switch 51 are moved from their initial positions. It will be noted that if the apparatus is rendered inoperative during a change giving operation e.g. as a result of mains failure the switches C4 and 71 when the power supply is resumed will cause the reset coil 55 to be energised so that the switch 51 is reset to its initial position. In this way the next person who operates the change giving machine is not cheated out of some of his change. If the switch 51 were not reset the machine would merely complete the change giving operation which was interrupted by the machine being rendered inoperative.

The coils 72 of the coin blocking mechanism (not shown) are de-energised when either of the switches C3 and 71 operates.

Three counters 73, 74 and 75 may be provided as shown in FIGURE 5, the counters being connected so as to be operated each time the coil 52, the relay C/3 and the relay A/3 are operated respectively, so as to count the number of threepenny tokens dispensed, the number of half crowns and the number of two-shilling coins inserted into the machine.

The coil 43 for disconnecting the register of the fruit machine during a change giving operation is not shown in FIGURE 5.

The invention is not limited to details of the foregoing embodiments. For instance a device as described in a co-pending application by the present inventor, U.S. Ser. No. 709,009, concerning a Slam Tilt for a Phonographic Fruit Machine may be used for rendering the apparatus inoperative if the apparatus is rocked, tilted, hit or otherwise subjected to shock.

For a better understanding of this specification reference may be made to the specification of a co-pending application of the present inventor, U.S. Ser. No. 709,063 relating to a Control Equipment for a Phonographic Fruit Machine.

I claim:
1. A dispensing apparatus capable of being operated in at least two different ways to disperse a succession of articles, which apparatus includes means for sensing the dispensing of each article, registering means for each possible operation of the apparatus for registering the number of articles dispensed said registering means stopping the dispensing of further articles when a predetermined number has been dispensed, and connecting means for connecting the sensing means to the registering means for a first operation of the machine, the connecting means being arranged, when the apparatus is operated according to a second operation of the machine to disconnect the sensing means automatically from the registering means for the said first operation and to connect it instead to the registering means for the said second operation, the connecting means also being arranged, on completion of said second operation, to connect the sensing means automatically with the registering means for the said first operation.

2. A dispensing apparatus as claimed in claim 1, having for at least the first or the second of its possible operations an article receiving part for receiving articles of different types and a control for controlling that operation of the apparatus, which control comprises a plurality of operable control switches said control switches arranged to be each positioned in the article receiving part of the apparatus and operated by the receipt of an article of a particular type and connected to start the dispensing of articles when operated, said registering means for that operation having a plurality of outputs, the control switches having selecting means for selecting each output when the control switch is operated and arranged to be operated by the registering means when the predetermined number of articles has been dispensed, and stopping means for stopping the dispensing of articles.

3. A dispensing apparatus as claimed in claim 2, in which the control is for controlling the said second operation of the apparatus, each control switch being connected to the connecting means so that the control switch operates the connecting means to disconnect the sensing means from the registering means for the said first operation and connect it to the registering means for the said second operation, and each output is connected to the connecting means to operate the output on completion of the second operation and operates the connecting means to restore the connection between the sensing means and the registering means for the said first operation.

4. A dispensing apparatus as claimed in claim 1, in which at least one registering means is a stepping switch.

5. A dispensing apparatus as claimed in claim 1, in which the connecting means includes a pawl, and the registering means for at least one of the possible operations of the apparatus includes a ratchet, the pawl and ratchet being for operation together, the connecting means being arranged, when the apparatus is being operated according to the second operation of the apparatus, to prevent the pawl from operating the ratchet.

6. A dispensing apparatus as claimed in claim 1, in which connecting means also includes a solenoid arranged to be operated, when the apparatus is being operated according to the said second operation of the apparatus, to move the pawl clear of the ratchet.

References Cited
UNITED STATES PATENTS

| | | | |
|---|---|---|---|
| 2,732,054 | 1/1956 | Hehn | 194—10 |
| 2,908,266 | 10/1959 | Cooper | 194—10 X |
| 2,974,772 | 3/1961 | Zeigle et al. | 194—10 X |
| 3,343,641 | 9/1967 | Robinson | 194—10 |

FOREIGN PATENTS

| | | |
|---|---|---|
| 518,679 | 3/1940 | Great Britain. |
| 871,039 | 6/1961 | Great Britain. |

SAMUEL F. COLEMAN, Primary Examiner